United States Patent
Milway et al.

(10) Patent No.: US 6,470,428 B1
(45) Date of Patent: Oct. 22, 2002

(54) SEQUENTIAL MEMORY ACCESS CACHE CONTROLLER

(75) Inventors: David Russell Milway, Cottenham; Fash Nowashdi, Luton, both of (GB)

(73) Assignee: Virata Limited, Cambridge (GB)

( * ) Notice: Subject to any disclaimer, the term of this patent is extended or adjusted under 35 U.S.C. 154(b) by 0 days.

(21) Appl. No.: 09/529,124

(22) PCT Filed: Nov. 11, 1998

(86) PCT No.: PCT/GB98/03377

§ 371 (c)(1),
(2), (4) Date: Jun. 26, 2000

(87) PCT Pub. No.: WO99/26142

PCT Pub. Date: May 27, 1999

(30) Foreign Application Priority Data

Nov. 13, 1997 (GB) .............................................. 9724031

(51) Int. Cl.⁷ .............................................. G06F 12/00
(52) U.S. Cl. .......................... 711/138; 711/154; 711/118
(58) Field of Search ................................. 711/118, 154, 711/138, 163, 144, 145

(56) References Cited

U.S. PATENT DOCUMENTS

| | | |
|---|---|---|
| 5,423,016 A | 6/1995 | Tsuchiya et al. ............. 395/425 |
| 5,586,294 A * | 12/1996 | Goodwin et al. ............ 395/464 |
| 5,586,296 A | 12/1996 | Bernstein et al. ............ 395/465 |
| 5,625,794 A | 4/1997 | Inoue et al. ................. 395/465 |

FOREIGN PATENT DOCUMENTS

| | | | |
|---|---|---|---|
| EP | 0502206 A1 * | 9/1991 | ........... G06F/12/08 |
| EP | 0509676 | 10/1992 | |
| EP | 0782079 | 7/1997 | |

OTHER PUBLICATIONS

IBM Technical Disclosure, "Conditional Cache Miss Facility For Handlind Short/Long Cache Requests", Jun. 1982, vol. 25. No. 1; p. 110.*

* cited by examiner

Primary Examiner—Do Hyun Yoo
Assistant Examiner—Kimberly N. McLean
(74) Attorney, Agent, or Firm—Pennie & Edmonds LLP

(57) ABSTRACT

A cache controller is disclosed that includes a first means for determining when data specified by a memory address requested by the processor is absent from the cache, and a second means for determining when the processor reads sequential memory addresses. The second means is activated when the first means detects that data is absent from the cache and causes the cache controller to (i) permit data to be supplied from the main memory to the processor, even when the data is available in the cache; (ii) inhibit the first means from determining whether requested data is available in the cache; and (iii) update the cache with data supplied to the processor from the main memory.

9 Claims, 1 Drawing Sheet

SEQUENTIAL MEMORY ACCESS CACHE CONTROLLER

CROSS REFERENCE TO RELATED APPLICATIONS

This application is a national stage application of international application PCT/GB98/03377, filed Nov. 11, 1998, which claims priority from Great Britain Patent application No. 9724031.1, filed Nov. 13, 1997.

FIELD OF INVENTION

The present invention relates to cache memories.

BACKGROUND OF THE INVENTION

In most current computers, the general-purpose or main memory is generally based on DRAM or similar memory chips which will maintain their contents for relatively long periods (though in fact they may require periodic refreshing to prevent loss of their contents).

The speed of such main memory (DRAMs and the associated circuitry) is substantially slower than the speed of typical modem processors. The use of cache memories has therefore become common. A cache memory is essentially a small associative memory which operates in parallel with the main memory. The principle underlying the cache technique is that if a word is accessed by a program, there is a strong chance that the program will soon want to access the same word again. The cache memory retains words which have been accessed by the program so that they are more quickly available for subsequent accesses.

For a memory read, the address is sent to the cache to see whether the desired data is in cache. If it is, it is read from the cache. If not, a "read-miss", the address is sent to the main memory to obtain the word: once the word has been read, it is normally written into the cache so that it will be available from the cache (although it would be possible for data to be flagged as "once-only" data, which a suitably arranged cache controller would not store in cache memory). In practice, the address is usually sent to the main memory in parallel with it being sent to cache, with the main memory read being aborted if it is found that the word is in cache. For a write, the word and its address are sent to the cache and the main memory in parallel, to ensure that the cache contents are always consistent with the main memory contents. (Optionally, writes may be buffered into the cache memory, the main memory, or both.)

Cache controllers which can detect whether data is in the cache memory, and organize updating of the cache are well known. It is also known that processors tend to access blocks of adjacent data, so many cache controllers are arranged to update in bursts; for example, when data is not in the cache, the controller will typically read a block of data surrounding the requested data, the boundaries of the block typically being chosen based on the physical architecture of the memory, to optimize performance.

The fact that the words accessed by a program have a strong tendency to occupy addresses close to each other allows an improvement in the way that a cache memory is operated, in a conventional burst mode cache controller. On a cache miss, when an address is being accessed and is found not to be in the cache, not only that address but adjacent addresses as well can be copied from the main memory into the cache. That is, a block of words is copied as a single burst.

The inventors have found that, even with a burst mode cache controller, performance may be degraded when the processor attempts to read a block of data that is not found in the cache. Following the first read miss when the block of data is requested, a conventional burst cache controller may initiate an update burst, in which a block of data is read into the cache. This will result in the processor waiting until surrounding data, including some which may not be required, is read into the cache. If a very small block size is chosen, then there is a fair chance that the program will want to access groups of words which extend beyond the size of the burst. That will result in repeated bursts copying adjacent blocks of words. Since each block copying involves main memory access overheads, that is less efficient than using a few large bursts. However, if a very large block size is chosen, there is a good chance that the program will only want to access a relatively small part of the block. That will also result in inefficiency, since part of the burst time will be used in copying undesired parts of the block. The block size must be chosen as a compromise in the light of these considerations. Afterwards, assuming the block read coincides with data requested, the processor will be supplied with data from the cache, but the initial delay may be significant.

Simpler cache controllers may supply the data from main memory, and then repeat the search in the cache for each subsequent word requested in the block; this can lead to poor performance on a long block of data, where each address is checked with the cache contents, then requested from memory, the initialisation of the memory address taking several clock cycles more than the actual data read operation.

The general object of the present invention is to provide a cache memory controller which alleviates the above problems.

EP-A-0782079 describes a mechanism to allow burst access by a processor to a non cacheable area of processor address space, typically IO locations, for improved performance. U.S. Pat. No. 5,423,016 describes how, in some circumstances, prefetching of instructions may be detrimental to system performance and suggests the use of an additional block buffer to alleviate this loss of performance. Data is first loaded into this block buffer and only transferred to the cache memory in the event of when the next cache miss occurs. Data in the block buffer is immediately available to the instruction processor. EP-A-0509676 describes a system for discovering instructions which have or cause a low cache hit ratio, keeping these instructions in a private memory, and preventing such instructions from being cached in subsequent accesses. U.S. Pat. No. 5,625,794 describes a cached disc controller application. The cache has distinct modes of operation which are selected by recording and analysing the usage for the datasets that it loads. Subsequent data accesses will be fetched from cache or disc depending on these usage statistics. It intuits the data characteristics. U.S. Pat. No. 5,586,296 is similar to EP-A-0509676 and it relates to an improved cache control mechanism which uses a "history" buffer to determine whether or not to cache particular data.

SUMMARY OF THE INVENTION

The invention effectively consists of a cache controller which includes means for sequential monitoring of the addresses being accessed by the processor and a means for supplying data from the main memory while those addresses are sequential. Cache systems which prefetch data are usually very effective; however, depending upon the programs, prefetching may be detrimental to system performance if the prefetched data is not subsequently used. The invention balances the prefetching of data with the memory system latency. The cache supplies data to the processor if it has the data within it, but in the event of a cache miss, where the cache does not contain valid data, the processor is responsible for fetching the data that it wants and the cache will enter a snoop mode whereby it keeps a copy of the data (whether instructions or operands) that the processor is fetching. The cache is purely passive in this role and does not initiate any memory accesses itself. During processor write operations the cache acts as a write-through cache, and the cache does not initiate any memory accesses of its own.

This mode of operation is effective when coupled with a memory system which provides write buffers and read ahead buffers. The combination of these additional buffers and the cache mode of operation results in a system which provides coherent main storage with minimal latencies due to prefetching.

Since the reading of sequential data from main memory is relatively fast once the initial address has been set up, the processor can be supplied with data relatively rapidly, by effectively discounting the cache as a source of data for the remainder of the block read. Thus, in some cases, the processor will be supplied with data from main memory even when the data is available in the cache. It is somewhat surprising that a performance improvement can be gained by disregarding the cache in these circumstances, but it is found that an overall improvement can result from removing the overheads associated with initiating a non-sequential memory access.

The updating burst automatically ends on the occurrence of a non-sequential address or a write, because the reading of sequential addresses from the main memory must then terminate. The updating burst will also end in the event of a gap or pause in the sequence of addresses, although the cache controller may in some cases be arranged to ignore gaps or pauses of less than a certain length.

It is important to note that in this system, once a cache updating burst has been initiated, cache intervention is suspended. Words are read from successive addresses in the main memory, and are passed simultaneously to the processor and the cache. As noted above, the major delays in main memory accesses are in the initial setting up of the main memory, taking several clock cycles. Once a main memory access is under way, reading of a sequence of successive addresses then occurs in successive clock cycles, i.e. one clock cycle per access. Thus for as long as the cache updating burst is maintained, the access rate from the main memory will be comparable with the access rate to the cache.

It is also important to note that the present cache memory does not require any modifications to the processor or the main memory.

The processor issues its address requests in the usual way. It knows that the time taken for response to those requests is variable, and it automatically waits for responses when necessary. When it issues the read request on which there is a cache miss, the response will be delayed. If it happens to continue by issuing a continuous sequence of read addresses following sequentially on from the address which produced the original miss, it will find that the responses follow on with little or no delays. So as far as the processor is concerned, the responses will appear to be cache hits. As soon as the sequence ends, the next processor request will be dealt with as either a true cache hit or a cache miss.

As far as the main memory is concerned, when a cache updating burst occurs, it will see a continuous sequence of sequential read requests, and will respond to these in the usual way; obviously, there will be no aborts interrupting the sequence. When the sequence ends, it will receive a non-sequential address which it will respond to in the usual way, and that response may or may not be aborted, depending on whether that memory access is a read with a cache hit.

BRIEF DESCRIPTION OF THE DRAWINGS

A computer system including a cache memory controller embodying the present invention will now be described, by way of example, with reference to the drawings. in which.

DESCRIPTION OF THE PREFERRED EMBODIMENTS

Figure 1:
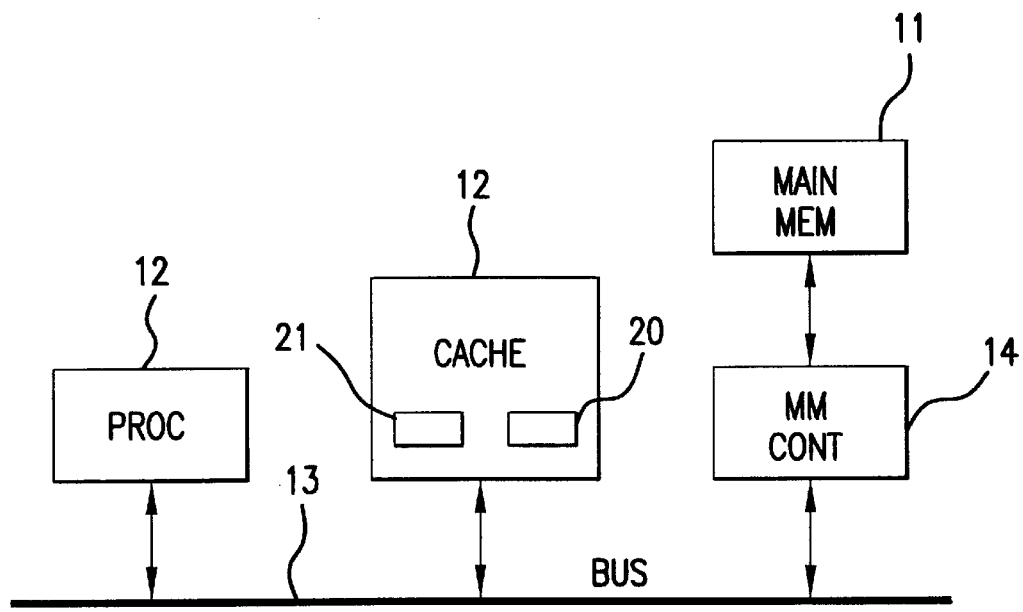
FIG. 1 is a simplified block diagram of the system.

Referring to FIG. 1, the system comprises a processor 10, a main memory 11, and a cache memory 12, all coupled to a bus 13 which carries data, addresses, and control signals; the main memory is coupled to the bus via a main memory controller 14. The cache memory includes a hit/miss detector 20 for detecting hits and misses. (Only reads require discrimination between hits and misses; all writes are automatically forced writes into both the cache and the main memory.) On a read hit, the hit/miss detector 20 sends a control signal over the bus 13 to the main memory to abort any read which may have been initiated in the main memory.

Figure 2:
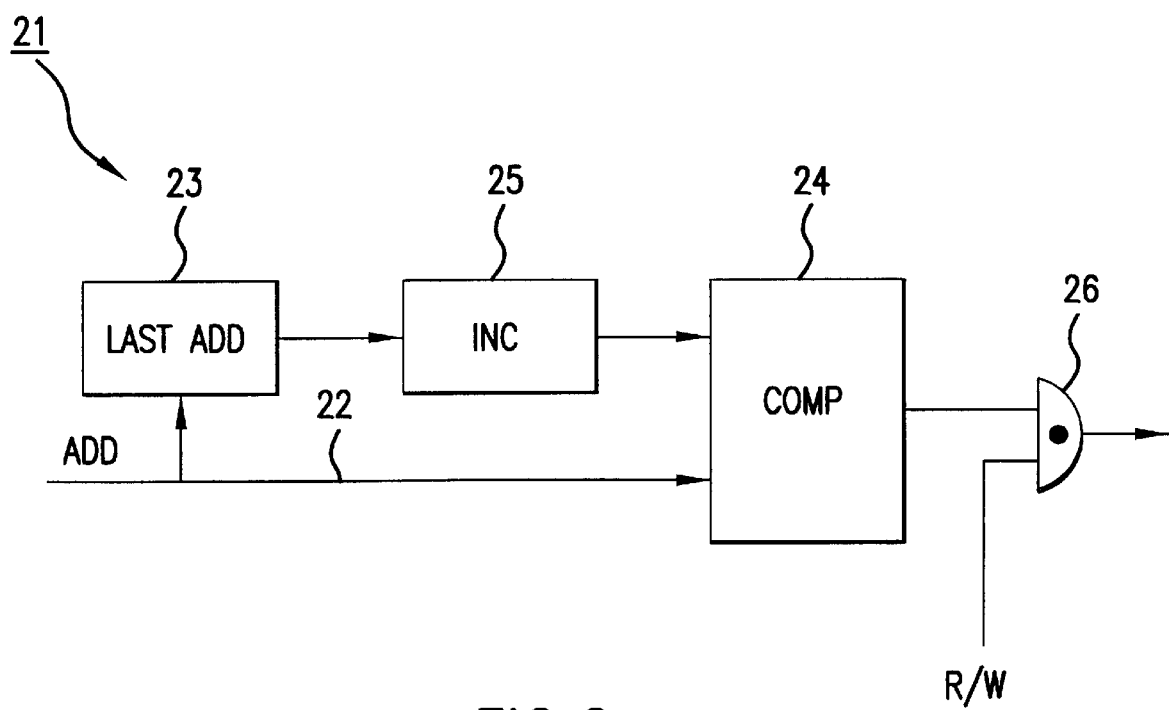
FIG. 2 is a simplified block of the updating burst control unit of the cache.

The present cache also includes an updating burst control unit 21 coupled to the hit/miss detector 20. When the hit/miss detector 20 detects a read miss, the updating burst control unit 21 becomes active, to initiate an updating burst. As shown in FIG. 2, this unit is fed on line 22 with the incoming read address from the processor (via bus 13). This address is fed to and stored in a last address register 23. On the next clock cycle, the new incoming address is fed to a comparator 24, which is also fed with the last address from register 23 via an incrementer 25 which increments it by 1. If there is a match, the comparator produces an output signal.

This output signal is fed to an AND gate 26, which is also fed with the signal R/W (also from the processor, via the bus 13) which indicates whether the current memory request is a read or a write. The gate 26 is enabled if the signal R/W indicates a read. If the comparator 24 produces a signal and gate 26 is enabled, gate 26 produces a signal indicating that a cache update burst is under way and continuing. This signal inhibits the cache from responding to the read requests in the usual way (i.e. it inhibits it from determining whether the words being requested by the processor are in the cache), and sets the cache to a write state where it treats the words and their addresses on the bus 13 as writes, so that the cache writes them into itself.

As soon as the signal from gate 26 disappears, the cache resumes normal operation.

In summary, the cache controller of this arrangement can be used with a processor, a cache memory and a main memory, the controller including means for detecting a read miss following a memory request from the processor and means for supplying data requested by the processor from the main memory in response to the detection of the read miss. The controller further includes means for detecting sequential monitoring of the following addresses requested by the processor, the means for supplying data from the main memory being arranged to continue to supply data from the main memory while those following addresses are sequential. Since the reading of sequential data from main memory is relatively fast once the initial address has been set up, the processor can be supplied with data relatively rapidly, by effectively discounting the cache as a source of data for the remainder of the block read. Thus, in some cases, the processor will be supplied with data from main memory even when the data is available in the cache. It is somewhat surprising that a performance improvement can be gained by disregarding the cache in these circumstances, but it is found that an overall improvement can result from removing the overheads associated with initiating a non sequential memory access.

Typically, of course, the cache will be updated as the data is supplied to the processor, as this requires minimal overhead, and need not slow down the processor.

What is claimed is:

1. A cache controller for use in combination with a processor (10), a cache memory (12) and a main memory (11);

the controller including first detecting means (20) for detecting cache hits and misses; a main memory controller (14) for supplying data requested by the processor (10) from the main memory (11) in response to the detection of a read miss in the cache memory (12); and second detecting means (21) for detecting when sequential addresses are read by the processor (10);

wherein the cache controller operates in:
(a) a normal mode, in which data is supplied from the cache memory (12) in the event of a read hit, or from the main memory (11) in the event of a read miss;
(b) or in an update mode, in which data continues to be supplied from the main memory to the processor (12) while said sequential addresses are being detected, even when the data is available in the cache memory (12), and in which the cache memory (12) is inhibited from supplying data to the processor (12), but is updated simultaneously with data from the main memory (11) as it is supplied to the processor (10);

the second detecting means (21) including means (22, 23, 24, 25) for signaling that the processor (10) is performing a sequential memory access.

2. A cache controller according to claim 1, wherein the means signaling sequential memory access includes a comparator (24) having an input (22) for a current address, and another input (23, 25) for a last address.

3. A cache controller according to claim 2, wherein said another input includes a register (23) for the last address and an incrementer (25) for incrementing the last address by one; the comparator (24) producing an output signal when sequential address inputs match.

4. A cache controller according to claim 2, including a gate (26) having one input connected to the comparator (24) and another input supplied with a read/write signal from the processor (10), whereby coincident inputs produce an output from the gate in the event of a read.

5. A cache controller according to claims 1, 2, 4, or 7, wherein said main memory (11) provides write buffers and read ahead buffers to provide coherent main storage with minimal latencies due to prefetching.

6. A method of supplying data to a processor (10) in a computer system having a main memory (11), a cache memory (12) and a cache controller, the method comprising:

detecting cache hits and misses;

supplying data requested by the processor (10) from the main memory (11) in response to the detection of a read miss; and detecting when sequential addresses are read by the processor (10);

operating the cache controller in either:
(a) a normal mode, in which data is supplied by the cache memory (12) in the event of a read hit, or from the main memory (11) in the event of a read miss;
(b) or in an update mode, in which data continues to be supplied from the main memory (11) while said sequential addresses are being detected, even when the data is available in the cache memory (12), and the cache memory (12) is inhibited from reading data in the update mode, but is updated simultaneously with data from the main memory as it is supplied to the processor (10).

7. A cache controller according to claim 3, including a gate (26) having one input connected to the comparator (24) and another input supplied with a read/write signal from the processor (10), whereby coincident inputs produce an output from the gate in the event of a read.

8. A system for controlling access to stored data, comprising:

a processor;

a main memory;

a main memory controller for interfacing the main memory to the processor via a system bus;

a cache; and a cache controller for interfacing the cache to the processor via a system bus, the cache controller comprising:
first means for determining when data specified by a memory address requested by the processor is absent from the cache; and
second means for determining when the processor reads sequential memory addresses, said second means being activated when said first means detects that data is absent from the cache, said second means causing said cache controller to:
(i) permit data to be supplied from the main memory to the processor, even when the data is available in the cache;
(ii) inhibit said first means from determining whether requested data is available in the cache; and,
(iii) update the cache with data supplied to the processor from the main memory.

9. A method for controlling access to a memory system, the memory system comprising a main memory and a cache, comprising:

a) receiving a first read request for first data from a first address in the main memory;

b) determining whether the first data is in the cache;

c) if the first data is in the cache, then:
1) aborting retrieval of the first data from the main memory, and
2) retrieving the first data from the cache;

d) if the first data is not in the cache, then:
1) retrieving the first data from the main memory, and
2) updating the cache with the first data;

e) receiving a second read request for second data from a second address in the main memory;

f) if the first data was not in the cache, then:
1) determining whether the first address and the second address are sequential;
2) if the first address and the second address are sequential, then:
i) retrieving the requested data from the main memory without determining whether the requested data is in the cache, and
ii) updating the cache memory with the requested data.

* * * * *

UNITED STATES PATENT AND TRADEMARK OFFICE
CERTIFICATE OF CORRECTION

PATENT NO. : 6,470,428 B1
DATED : October 22, 2002
INVENTOR(S) : David Russell Milway and Farshid Nowshadi It is certified that error appears in the above-identified patent and that said Letters Patent is hereby corrected as shown below:

<u>Title page,</u>
Item [75], replace the inventor's name "Fash Nowashdi" with -- Farshid Nowshadi --.

<u>Drawings,</u>
Fig. 1, replace the reference numeral "12" indentifying the box PROC with -- 10 --.

Signed and Sealed this

Twenty-second Day of April, 2003

JAMES E. ROGAN
*Director of the United States Patent and Trademark Office*